(12) United States Patent
Rullmann et al.

(10) Patent No.: US 9,917,755 B1
(45) Date of Patent: Mar. 13, 2018

(54) PROVIDING FAST RADIO-FREQUENCY DELAY MEASUREMENTS FOR ENVELOPE TRACKING

(71) Applicant: NATIONAL INSTRUMENTS CORPORATION, Austin, TX (US)

(72) Inventors: Markus Rullmann, Dresden (DE); Hans Marcus Krüger, Dresden (DE)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/457,413

(22) Filed: Mar. 13, 2017

(51) Int. Cl.
 *H04L 12/26* (2006.01)
 *H04L 5/00* (2006.01)
 *H04W 52/52* (2009.01)

(52) U.S. Cl.
 CPC ........ *H04L 43/0852* (2013.01); *H04L 5/0048* (2013.01); *H04L 43/18* (2013.01); *H04W 52/52* (2013.01)

(58) Field of Classification Search
 CPC .......................... H04L 43/0852; H04L 5/0048
 See application file for complete search history.

(56) References Cited

U.S. PATENT DOCUMENTS

| 8,942,313 B2 * | 1/2015 | Khlat | H03F 1/0227 327/127 |
|---|---|---|---|
| 2016/0173031 A1 * | 6/2016 | Langer | H03F 1/0205 330/126 |

OTHER PUBLICATIONS

Rupp, Craig E. et al.—"A Novel Time Misalignment Estimation Algorithm for Envelope Tracking (ET) Power Amplifiers (PA)"—2014 IEEE 25th International Symposium on Personal, Indoor and Mobile Radio Communications—Sep. 2-5, 2014—pp. 933-936 (4 pages).

Zai, Andrew H.—"Efficient Supply-Modulated Transmitters for Variable Amplitude Radar"—Electrical Engineering Graduate Theses & Dissertations—Jan. 1, 2014—University of Colorado, Boulder, Colorada USA (143 pages).

* cited by examiner

*Primary Examiner* — Tuan H Nguyen
(74) *Attorney, Agent, or Firm* — Meyertons Hood Kivlin Kowert & Goetzel, P.C.; Jeffrey C. Hood (57) ABSTRACT

Techniques are disclosed related to determining delay in a radio frequency (RF) communications device configured to perform envelope tracking. The RF communications device may comprise a power amplifier and an envelope tracker. First and second input stimuli signals may be transmitted to each of the power amplifier and envelope tracker, respectively. The RF communications device may output, by the power amplifier, an output signal to a vector signal analyzer (VSA). The VSA may determine a first delay offset by cross-correlating the output signal with a reference signal, and the VSA may determine a second delay offset based on an amplitude distortion of the output signal. A relative delay between the first and second input stimuli signals may be determined based on a difference between the first and second delay offsets.

20 Claims, 9 Drawing Sheets

PROVIDING FAST RADIO-FREQUENCY DELAY MEASUREMENTS FOR ENVELOPE TRACKING

FIELD OF THE INVENTION

The present invention relates to the field of telecommunication, and more specifically, to systems and methods for performing delay measurements on power amplified radio frequency signals that employ envelope tracking.

DESCRIPTION OF THE RELATED ART

Given a major focus in portable electronics to reduce power consumption, much attention has been given to linearization techniques such as envelope tracking with power amplifiers. Modern wireless communication standards (e.g., 4G LTE and other communication standards) employ amplitude modulation as well as frequency modulation to encode information. The inclusion of amplitude modulation may introduce power inefficiencies that arise from a difference between the peak power and the average power of the amplitude modulated signal. For example, a power amplifier that is configured to operate with a constant voltage may dissipate energy while it is operating below the peak power, leading to energy inefficiency. Envelope tracking is one method by which this energy inefficiency may be mitigated.

Envelope tracking adjusts the voltage supplied to the power amplifier based on the current amplitude of the input signal. Typically, an amplitude envelope is determined based on the input signal, and the amplitude envelope is then used to control the voltage supplied to the power amplifier. Hence, the power amplifier does not operate with more voltage than is needed, increasing its energy efficiency.

Determining and processing the amplitude envelope may introduce undesirable latency, which may cause a mismatch between the envelope tracked supplied voltage and the amplified signal. As such, determining and correcting the magnitude of this latency may improve the performance of the amplifier. Previous methods for determining and correcting this delay require considerable time and resources. As such, improvements in the field may be desirable.

SUMMARY

Embodiments described herein relate to systems, memory media, and methods for determining delay in a communications device configured to perform envelope tracking on output signals. In some embodiments, the communications device may operate in the radio frequency (RF) and may be called an RF device.

Some embodiments relate to an RF device comprising a power amplifier and an envelope tracker. A first stimuli signal may be transmitted by a signal generator to the power amplifier, and a second stimuli signal may be transmitted by a signal generator to the envelope tracker. In some embodiments, the envelope tracker may be configured to output a time-varying voltage to the power amplifier based on the second stimuli signal.

In some embodiments, a vector signal analyzer (VSA) may be configured to receive an output signal from the RF device, wherein the output signal is based on the first stimuli signal and the time-varying voltage. In some embodiments, the VSA may be configured to cross-correlate a reference signal with the output signal to determine a first delay offset associated with the first stimuli signal. In some embodiments, the VSA may be configured to determine a second delay offset associated with the time varying voltage based on an amplitude distortion of the output signal. In some embodiments, the VSA may determine a relative delay between the first and second stimuli signals based on a difference between the first and second delay offsets.

In some embodiments, the reference signal and the first stimuli signal may comprise the same periodic constant amplitude zero autocorrelation (CAZAC) waveform. In some embodiments, the second stimuli signal comprises a constant voltage signal that temporarily drops to a lower voltage at periodic intervals. In some embodiments, each of the first and second stimuli signals comprise periodic signals with the same or different periods.

In some embodiments, subsequent signals received by each of the envelope tracker and the power amplifier may be time-adjusted based on the determined relative delay. In some embodiments, the time-adjustment may be accomplished by adjusting the transmission timing of subsequent inputs to the envelope tracker and/or power amplifier. In other embodiments, the time-adjustment may be accomplished by adjusting a delay chain within a DC/DC converter comprised within the envelope tracker.

In some embodiments, determination of the first and second delay offset may be performed by averaging over determined first and second delay offsets for a plurality of periods.

In some embodiments, a relative delay may be determined for each of a plurality of configurations of the device, and each determined relative delay may be stored in a lookup table associated with its respective configuration. In these embodiments, the RF device may be configured to perform time-adjustment based on its present configuration by using the lookup table.

Note that the techniques described herein may be implemented in and/or used with a number of different types of devices, including but not limited to base stations, access points, cellular phones, portable media players, tablet computers, wearable devices, RF semiconductor components, RF power amplifiers, Front End Modules, transceivers, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a non-transitory medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Computer System—any of various types of computing or processing systems, including a personal computer (PC), a mainframe computer system, a workstation, a laptop, a network appliance, an Internet appliance, a hand-held or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

DETAILED DESCRIPTION

Power amplifiers (PA) with envelope tracking circuitry may pose the problem that a different delay is introduced between the input signal generator and the envelope tracking signal generator, such that the PA displays suboptimal performance. In many implementations, these PAs may operate in radio frequencies (RFs), and may be referred to as RF power amplifiers. In some embodiments, the correct time alignment may not be measurable directly at the PA inputs or outputs. In these cases, it may be desirable for the input signal and the envelope tracking signal to be aligned properly at the PA assembly.

Embodiments presented herein describe a measurement system to determine the time delay between the input signal generator and the envelope tracking signal on such a PA assembly. Some embodiments describe a method to directly measure the time delay by means of observing distortions in the output signal from the PA. The direct method may allow a very fast measurement of the time delay, as compared to sweep measurements or other iterative methods.

Previous implementations to determine the time delay have employed an iterative method to sweep across a range of time delays while the PA is stimulated with a test signal. In these implementations, for each instance of time delay the performance is measured. The correct time delay may be assumed to be the one that has the best performance according to some criteria. These implementations that employ sweep type measurements may be very slow because an optimal value may not be converged upon until several measurement iterations. Embodiments presented herein improve on these previous implementations by determining the time delay with a single measurement. In some embodiments, the techniques described herein may be used in conjunction with sweep or iterative type approaches to determine time delay.

In some embodiments, the measured delay varies based on the configuration of the DUT. Some non-limiting examples of configurational changes that may cause the delay to vary are different power levels of the PA, different carrier frequencies supplied as a signal to the PA, different filters applied to/within the DUT, etc. In some embodiments, a computer readable memory medium may store the measured delays for each configuration along with a description of the respective configuration of the DUT. In some embodiments, a device may have multiple PAs integrated into one package. Such devices may contain switches to direct which input and PA are used. In these embodiments, the signal path, which corresponds to the set of switches being used, may be an important configuration for measuring the delay.

Figure 1:
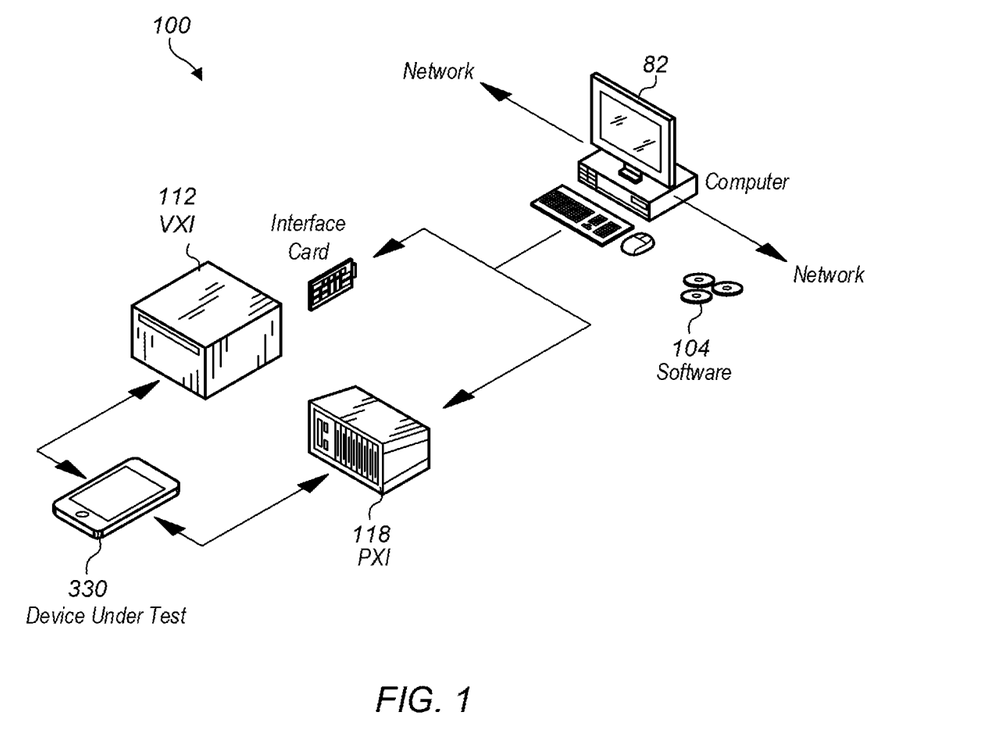
FIG. 1 illustrates an exemplary envelope tracking calibration setup for timing calibration of a unit under test, according to some embodiments.

FIG. 1—Exemplary System for Measuring Signal Delay

FIG. 1 illustrates an exemplary system that is configured to perform measurements of signal delay, according to some embodiments presented herein. A computer 82 may be used by a user to conduct the delay measurement process, and may be connected to a network and to the measurement apparatus. Software 104 may be installed on the computer to conduct the delay measurement process. The computer 82 may be connected to any of a variety of signal generating apparatuses, according to various embodiments. For example, the computer may be connected to a PXI 118 with configurable interface cards. Alternatively or additionally, the computer may be connected to a VXI 112 that is configured with interface cards. The PXI 118 and/or the VXI 112 may serve as waveform generators to supply a signal to the Device Under Test (DUT) 330. The VXI and/or PXI may further function as a vector signal analyzer (VSA), to receive and analyze an output signal from the DUT. In other embodiments, the signal generator and/or signal analyzer may be comprised within the computer 82, which may be directly connected to the DUT 330.

Embodiments presented herein measure the electrical characteristics (e.g. radiofrequency (RF) performance, power added efficiency) of a device under test (DUT) with envelope tracking functionality. In some embodiments, the DUT 330 may be stimulated with a control signal (e.g. from an arbitrary waveform generator (AWG), a vector or RF signal generator (VSG, RFSG), which may be comprised within a PXI, VXI, a computer, or some other signal generator, in various embodiments). The timing of the AWG and VSG output signals may be aligned such that the DUT exhibits optimal electrical characteristics. In some embodiments, the signal characteristics may be measured with a vector signal analyzer (VSA), which may be comprised within any of a PXI, VXI, or other computer system.

In some embodiments, separate devices may be used to perform some of the functions (e.g. the AWG, VSG, VSA, etc.) described above. These dedicated devices, which may be known in the art as "box" type instruments, may also be connected to a computer system. In some embodiments, the connected computer system may be configured to receive outputs from or provide inputs to the dedicated instruments. The connected computer system may also, in some embodiments, collect and store data or display outputs from the devices.

The illustrated embodiment shows an exemplary system that may be used to perform calibration of a DUT. Calibration may be performed as a production test step during device manufacture or assembly. In some embodiments, system 100 may be also be used for device characterization or production test. In some embodiments, calibration may be performed to establish a suitable temporary condition for measurements. In other embodiments, measurements may be used for integration with the final product.

Figure 2:
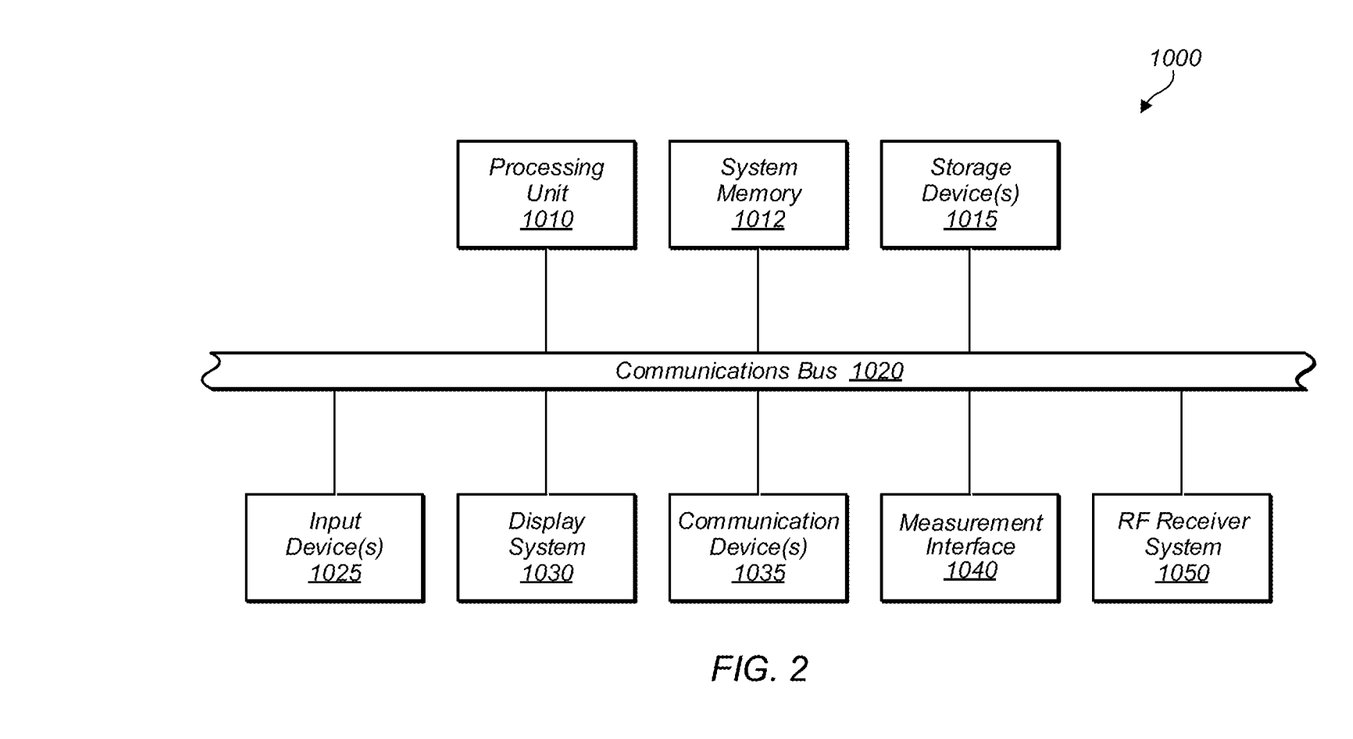
FIG. 2 illustrates an exemplary communication bus connecting a computer to the delay measuring system, according to some embodiments.

FIG. 2

FIG. 2 illustrates an exemplary communication bus 1020 connecting a computer to the delay measuring system. The communications bus 1020 may be coupled to a processing unit 1010, a system memory 1012, and storage device(s) 1015. The communications bus 1020 may be further coupled to an input device(s) 1025 to receive input, a display system 1030, a communications device(s) 1035, a measurement interface 1040, and an RF receiver system 1050. The RF receiver system 1050 may be configured to receive inputs from the AWG, VSG, VSA, or other components of the system. In some embodiments, the RF receiver system receives signals from each component of the delay measuring system. The display system 1030 that may facilitate user interface with the delay measuring system. The measurement interface 1040 may facilitate communication between the communications bus and the delay measuring apparatus. The RF receiver system 1050 may be configured to receive radio frequency signals from the delay measuring apparatus. In some embodiments, the RF receiver system 1050 may be comprised within an external AWG or VSG.

Figure 3:
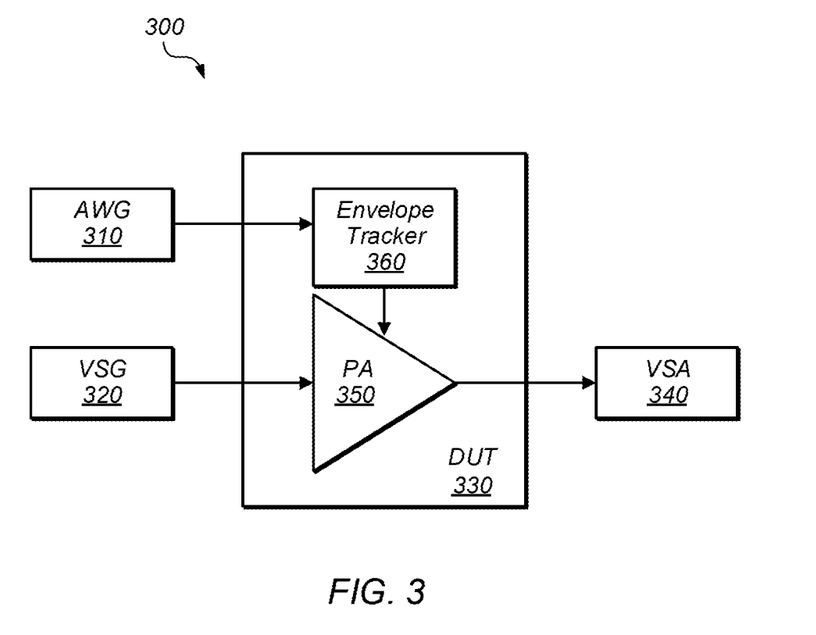
FIG. 3 is a schematic diagram showing a typical measurement setup, according to some embodiments.

FIG. 3—Exemplary Envelope Tracking System

FIG. 3 shows a measurement setup by which a relative delay may be determined in a DUT 330, according to some embodiments. DUT 330 may include an envelope tracker 360, which itself may include a direct current/direct current (DC/DC) converter, and a power amplifier (PA) 350. The envelope tracker 360 may be configured to receive a signal, and output a time-varying voltage to the power amplifier based on the signal. In some embodiments, VSG 320 inputs a stimuli signal to PA 350 and AWG 310 inputs a stimuli signal to the envelope tracker 360. In other embodiments, the stimuli signals may be provided by other devices with similar characteristics, e.g. the stimulus to the PA 350 may be provided by another AWG that has sufficient bandwidth. The envelope tracker may input a time-varying voltage based on the signal from AWG 310 to PA 350. PA 350 may output a signal based on the stimuli from VSG 320 and the time-varying voltage from the envelope tracker 360 to a VSA 340. In other embodiments, the output from the PA 350 may be sent to a device other than a VSA, such as a high speed oscilloscope. In other words, the PA 350 may output a signal that comprises an amplitude modulated version of the VSG stimuli signal, wherein the output signal is amplitude modulated based on the time-varying voltage received from the envelope tracker. This amplitude modulation is commonly referred to as nonlinear distortion by the PA. The DUT 330, in some embodiments, operates using radiofrequency (RF) signals as inputs and/or outputs and may be configured to receive and/or transmit the signals. In some embodiments, the VSG stimuli signal and the AWG stimuli signal may be configured to be periodic signals with the same or different periods.

In some embodiments, the signal from VSG 320 has a low or zero autocorrelation. Autocorrelation is a property of a function that describes how similar the function is to itself when shifted by various time intervals. The signal from VSG 320 may be specified so its autocorrelation function comprises periodic spikes at zero and integer period offsets.

In some embodiments, the signal from VSG 320 may be a constant amplitude zero autocorrelation (CAZAC) waveform. CAZAC sequences are complex-valued periodic sequences with cyclically shifted autocorrelation equal to zero and constant amplitude. An embodiment of a CAZAC sequence is a Zadoff-Chu sequence. As is well known in the art, some embodiments of CAZAC sequences may be referred to as "chirps".

In some embodiments, the signal from AWG 310 is a constant voltage signal that temporarily changes voltage at periodic intervals. The signal from AWG 310 may be a higher voltage signal that temporarily reduces to a lower voltage in a certain manner, e.g. a square notch, Gaussian, etc. In other embodiments, the AWG signal may temporarily rise in voltage, or temporarily oscillate in voltage. In some embodiments, the change in voltage is centered in the time interval over which the signal is defined (for example, a signal with length T has the voltage reduction at time T/2). Other predetermined locations of the change in voltage are also possible, as desired.

In some embodiments, an RF measurement device such as a vector signal analyzer (VSA) may be used to measure the VSG and the AWG signal timing. The VSA may determine the relative delay from the output of the PA 350 by means of detecting directly the distortions created by the PA.

Figure 4:
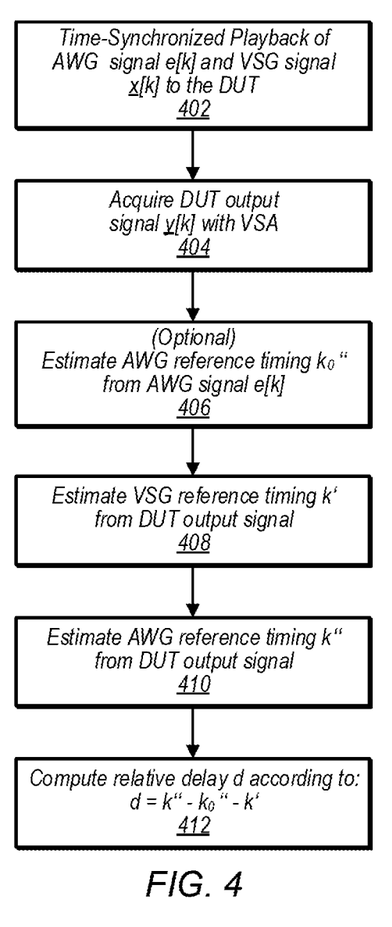
FIG. 4 is a flow chart diagram illustrating an exemplary method computing relative delay in an envelope tracking apparatus, according to some embodiments

FIG. 4—Method for Determining Relative Delay in an Envelope Tracking Apparatus FIG. 4 is a flow diagram illustrating steps by which a measurement procedure of a timing offset may be performed:

At 402 in the illustrated embodiment, both the AWG and VSG output a stimuli signal to the DUT, where the stimuli signals are the signals previously described. e[k] may be the signal from the AWG and x[k] may be the signal from the VSG, where e[k] and x[k] may be periodic functions of time k. The signals from the AWG and VSG may be synchronized in time such that the beginning of the repeated period of each stimuli signal is coincident. For example, signal synchronization may be performed using National Instruments "TCLK" technology. In some embodiments, a backplane synchronization signal may be used to adjust a sample clock in both signal generators. In some embodiments, synchronization of the signals may be obtained in the range of tens of picoseconds.

At 404 in the illustrated embodiment, the DUT outputs an amplified signal, y[k], to the VSA. For example, the output signal y[k] may comprise the stimuli signal x[k] that is amplitude-modulated based on the e[k] signal.

Steps 406, 408, and 410 are presented in a specific order in the illustrated embodiment; in other embodiments they may be performed in other orders. The values for $k_0''$, $k'$, or $k''$ may be computed in any order, and they may even be computed simultaneously.

At 406 in the illustrated embodiment, the AWG signal e[k] is analyzed to estimate the AWG reference timing $k_0''$. In some embodiments, the weighted center of the AWG reference signal e[k] may be offset in time from the RF synchronization reference. Calculating $k_0''$ may be optional; in some embodiments $k_0''$ is known at design time or the AWG signal may be shifted such that $k_0''$ is zero. In some embodiments, calculating $k_0''$ from e[k] is performed analogously to calculating $k''$ from a[k], for example, as described below.

At 408 in the illustrated embodiment, the measured signal y[k] is analyzed to estimate the timing of the VSG stimuli, $k'$. The timing $k'$ may be a delay offset that originates from the reception and processing of the stimuli signal x[k]. The timing $k'$ may be estimated by comparing the DUT output y[k] with a reference signal. The DUT output y[k] may be cross-correlated with the reference signal to determine $k'$. In some embodiments, the reference signal is the same as the input VSG signal, x[k]. In other embodiments, the reference signal is not the same signal as the input VSG signal, x[k], but the reference signal may have properties (e.g. zero correlation with x[k], constant amplitude, etc.) that allow for the synchronization of the signal x[k] to be determined. The time information may be recoverable from the measured signal even if it contains artefacts and/or sections with non-linear compression. The method for determining $k'$ based on the output signal y[k] is explained in further detail below in the discussion of FIG. 5.

At 410 in the illustrated embodiment, the measured signal y[k] is analyzed to estimate the timing of the AWG stimuli, $k$. The timing $k''$ may be a delay offset that originates from the reception and processing of the signal e[k]. In some embodiments, the change in voltage of the AWG signal affects the PA such that the voltage change causes a change in the output of the PA. AWG timing $k''$ may be identified from the measured signal y[k] that contains a distortion caused by the AWG signal output. The AWG stimuli signal content (or structure) may enforce a time varying distortion on the amplified DUT output signal. The method for determining $k''$ based on the output signal y[k] is explained in further detail below in the discussion of FIG. 7.

At 412 in the illustrated embodiment, the relative delay, d, is computed by subtracting $k_0''$ and $k'$ from $k''$. The delay offset from the VSG signal and the AWG reference timing are subtracted from the delay offset from the AWG signal to calculate the relative delay. In some embodiments, if the AWG and VSG signals are sufficiently well synchronized, it may not be necessary to compute the reference timing offset $k_0''$, such that the relative delay may be computed by subtracting $k'$ from $k''$.

Subsequent to determination of the delay, in some embodiments, the timing of subsequent AWG signals and/or VSG signals may be adjusted based on the calculated relative time delay between the AWG signal and the VSG signal. In some embodiments, the time alignment may be adjusted by controlling the relative delay between the AWG and VSG signals. In other embodiments, the time delay may be adjusted by adjusting a delay chain within the DC/DC converter comprised within the envelope tracker.

Figure 5:
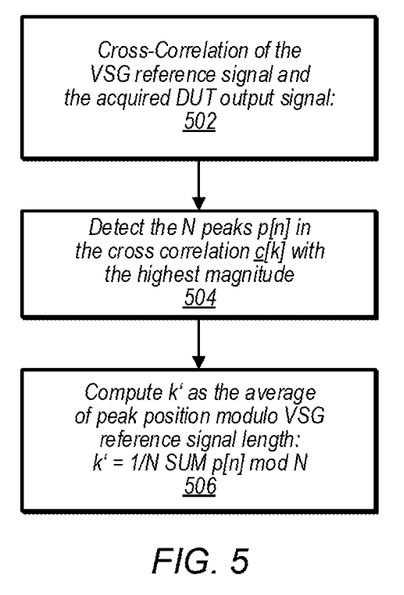
FIG. 5 is a flow chart diagram illustrating an exemplary method for computing the time delay of a vector signal generator (VSG) reference signal, according to some embodiments.

FIG. 5—Method for Determining VSG Stimuli Signal Offset

FIG. 5 is a flow chart illustrating an exemplary analysis used to determine the timing offset associated with the VSG stimuli signal, according to some embodiments.

At 502 in the illustrated embodiment, the measured signal y[k] is cross-correlated with the VSG stimuli signal x[k]. The cross-correlation may be calculated as c[k]=∫x[k']*y[k'−k]dk', which may result in a quasi-periodic function of time, c[k], with the same period as x[k].

At 504 in the illustrated embodiment, a number of peaks, N, with the highest magnitude in the cross correlation are identified. For example, the periodic function c[k] may be close to zero for most values of k, with spikes occurring at integer periods. Because the VSG stimuli signal was selected to have desirable autocorrelation properties, the spikes may occur when the offset k is equal to the delay offset, modulo the period of the signal, of the measured signal y[k].

At 506 in the illustrated embodiment, the timing k' is computed by taking the average of the modulus of each of the N peak positions with respect to the period of the reference signal. The average of these N peak positions, modulo the period of the reference signal, may provide an accurate approximation of the delay offset of the measured signal y[k].

Figure 6:
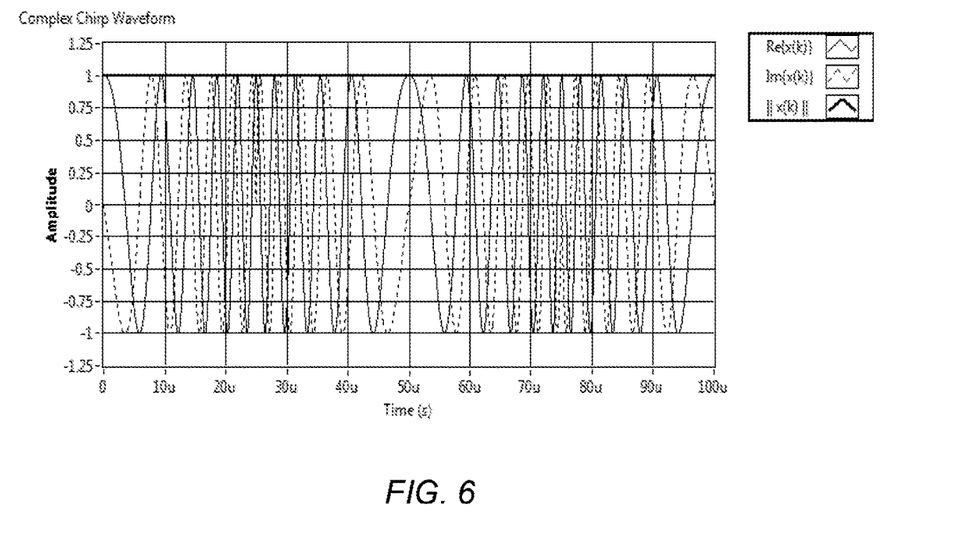
FIG. 6 is a graph of a typical chirp pattern used in the method described in FIG. 5, according to some embodiments.

FIG. 6—Exemplary Chirp Pattern

FIG. 6 illustrates an exemplary complex chirp pattern with a constant signal amplitude that may be used as the VSG stimuli signal x[k], according to some embodiments. This may result in a constant RF signal envelope and VSG output. The complex chirp may have desirable autocorrelation properties that allow for detecting the signal timing in the measured signal. In some embodiments, the VSG stimuli signal may have a limited length and may be repeated periodically. The complex chirp may be parameterized such that it may have a configurable bandwidth.

Figure 7:
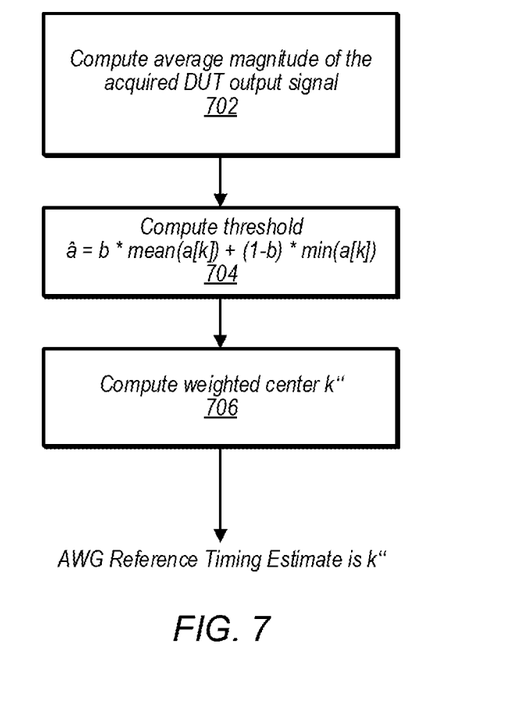
FIG. 7 is a flow chart diagram illustrating an exemplary method for computing the time delay of an arbitrary waveform generator (AWG) reference signal, according to some embodiments.

FIG. 7—Method for Determining AWG Stimuli Signal Offset

FIG. 7 is a flow chart illustrating an exemplary analysis used to determine the timing offset associated with the AWG stimuli signal, according to some embodiments.

At 702 in the illustrated embodiment, the measured signal y[k] may be divided into M chunks where each chunk has the length K of the e[k] signal's period. In some embodiments, the average signal magnitude may be computed across the chunks as a[k]=1/MΣ|y(k+iK)|. Computing the average signal magnitude across a plurality of chunks may remove noise from the measurement and improve precision, in some embodiments. The position of the change in voltage of the measured signal may be identified, since within the change of voltage, the measured signal may have a significantly different magnitude as compared to the average. In some embodiments, the change of voltage is a decrease in voltage and the magnitude of the measured signal is below the average when the voltage has dropped.

At 704 in the illustrated embodiment, a threshold is computed. The threshold may be used to determine when the output signal magnitude has deviated sufficiently far from the average signal magnitude to be considered a candidate location of the change in the signal e[k]. The threshold may be computed by taking the mean of the signal average a[k], multiplying by a constant b, and adding to that the minimum of the signal a[k] multiplied by the constant 1−b. The constant b may be a configurable constant set between 0 and 1, which may be configurable to set stricter or more lax requirements for candidate locations. For example, setting the constant b to be close to 1 may set the threshold to be close to the signal average a[k], so that any signal strength lower than the signal average may be considered a location of a notch. On the other hand, setting the constant b to be close to zero may set the threshold to be close to the minimum of the signal a[k], so that the signal strength must be very close to the minimum signal strength to be considered a candidate location of the notch. Alternative methods for deriving a threshold are also possible, wherein the threshold is determined to be somewhere between the average and the minimum signal strength, as desired.

At 706 in the illustrated embodiment, the weighted center of these dips in magnitude may be computed to get the AWG timing. The weighted center may be computed by first trimming a[k] by setting a[k] to zero for each value of k wherein a[k] exceeds the computed threshold of 704. The weighted center may then be computed as $$k'' = \frac{\sum k * a[k]}{\sum a[k]},$$

where the summation is performed over all values of k and k is calculated modulo the period of the signal e[k]. It may be appreciated that the weighted center is calculated as a weighted sum of each value of k wherein a[k] satisfies the computed threshold. The AWG reference timing estimate may then be set to equal k''.

In some embodiments, the change in signal e[k] may be, for example, an increase in voltage, an oscillation in voltage, etc. The previous descriptions are not meant to limit the calculation of the delay offset k'' to a signal that comprises a decrease in voltage. In some embodiments, the center of the change in voltage may be measured by comparing the mean to the maximum distance from the mean. In these embodiments, the threshold would be a limit on the distance from the mean.

Figure 8:
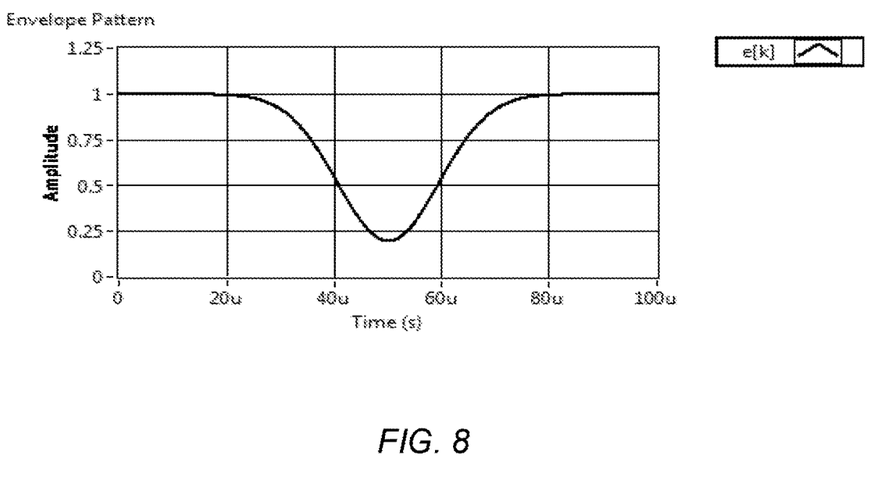
FIG. 8 is a graph of a typical envelope pattern used in the method described in FIG. 7, according to some embodiments.

FIG. 8—Exemplary Envelope Pattern

FIG. 8 illustrates an exemplary envelope pattern that may be used as the AWG stimuli signal, according to some embodiments. As illustrated, the envelope pattern comprises a constant high signal with a single notch where the high signal drops to a lower signal level. Within this notch period the PA may distort the RF signal. Identification of the location of the distorted signal may allow determination of a delay offset of the output signal, according to the methods described above, in some embodiments. In some embodiments, the AWG stimuli signal may have a limited length and may be repeated periodically. In this particular embodiment, the notch is located at the center of an AWG signal period, although other locations of the notch are also possible. In some embodiments, the VSG and AWG stimuli signals may have the same period.

Figure 9:
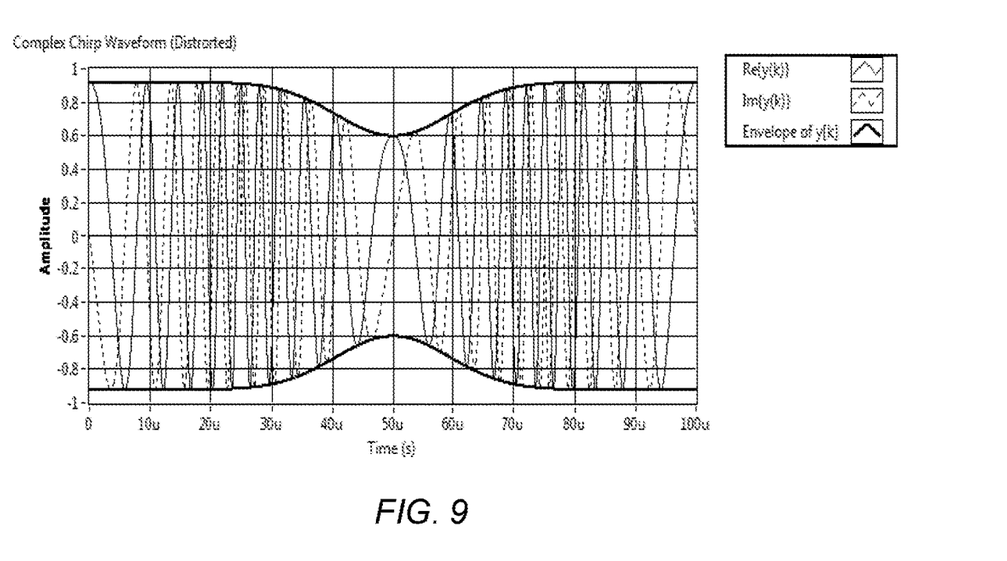
FIG. 9 is a graph of a typical output pattern analyzed in the method described in FIG. 4, according to some embodiments.

FIG. 9—Exemplary Output Signal

FIG. 9 illustrates an exemplary measured output signal that may be analyzed to determine the timing delays.

In some embodiments, the measured signal may contain multiple periods of the stimuli signals. Only a single period is illustrated in FIG. 9. In the illustrated embodiment, the output signal comprises the VSG chirp signal, modulated by the AWG voltage modulation signal. The first and second delay offsets may be determined by averaging over the determined first and second delay offsets for multiple periods. In some embodiments, the accuracy and precision of the determined timing offset may be improved by averaging the results obtained for each of the multiple periods.

The presently disclosed embodiments may be realized in any of various forms. For example, any of the various embodiments may be realized as a computer-implemented method, a computer-readable memory medium, or a computer system. Furthermore, any of the presently disclosed embodiments may be realized using one or more custom-designed hardware devices such as ASICs and/or using one or more programmable hardware elements such as FPGAs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile computing device, a tablet computer, a wearable computer, etc.

In some embodiments, a set of computers distributed across a network may be configured to partition the effort of executing a computational method (e.g., any of the method embodiments disclosed herein).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for determining delay in a radio frequency (RF) device, wherein the RF device comprises a power amplifier and an envelope tracker, the method comprising:
    transmitting a first stimuli signal to the power amplifier;
    transmitting a second stimuli signal to the envelope tracker;
    receiving, from the power amplifier, an output signal based on each of the first stimuli signal and the second stimuli signal,
    cross-correlating a reference signal with the output signal to determine a first delay offset;
    determining a second delay offset based on an amplitude distortion of the output signal; and
    determining a relative delay between the first and second stimuli signals based on a difference between the first and second delay offsets.

2. The method of claim 1, wherein the reference signal and the first stimuli signal comprise the same periodic constant amplitude zero autocorrelation (CAZAC) waveform.

3. The method of claim 1, wherein the second stimuli signal comprises a constant voltage signal that temporarily drops to a lower voltage at periodic intervals.

4. The method of claim 1, wherein each of the first and second stimuli signals comprise periodic signals with the same period.

5. The method of claim 4, wherein said determination of the first and second delay offset is performed by averaging over determined first and second delay offsets for a plurality of periods.

6. The method of claim 1, wherein each of the first and second stimuli signals comprise periodic signals with different periods.

7. The method of claim 1, wherein the first stimuli signal is sent from a first signal generator and the second input stimulus signal is sent from a second signal generator, the method further comprising:
    adjusting a relative time delay applied to subsequent signals from each of the first and second signal generators based on the determined relative delay.

8. A system for determining delay in a radio frequency (RF) communications device, the system comprising:
    the RF communications device comprising a power amplifier and an envelope tracker, wherein the envelope tracker is configured to supply a voltage to the power amplifier;
    a first signal generator coupled to the power amplifier;
    a second signal generator coupled to the envelope tracker;
    a vector signal analyzer coupled to an output of the power amplifier;
    wherein the system is configured to:
        input, from the first signal generator, a first input stimuli signal into the power amplifier;
        input, from the second signal generator, a second input stimuli signal into the envelope tracker;
        supply, from the envelope tracker to the power amplifier, a time-varying voltage based on the second stimuli signal;
        output, based on each of the first and second input stimuli signals, by the power amplifier, an output signal into a signal analyzer;
        perform, by the signal analyzer:
            cross-correlation of a reference signal with the output signal to determine a first delay offset;
            determination of a second delay offset based on an amplitude distortion of the output signal; and
        determine a relative delay between the first and second input stimuli based on a difference between the first and second delay offsets.

9. The system of claim 8, wherein the reference signal and the first input stimuli signal comprise the same periodic constant amplitude zero autocorrelation (CAZAC) waveform.

10. The system of claim 8, wherein the second input stimuli signal comprises a constant voltage signal that temporarily drops to a lower voltage at periodic intervals.

11. The system of claim 8, wherein each of the first and second input stimuli signals comprise periodic signals with the same period.

12. The system of claim 8, wherein each of the first and second input stimuli signals comprise periodic signals with different periods.

13. The system of claim 8, wherein the first input stimuli signal is received from a first signal generator and the second input stimuli signal is received from a second signal generator, wherein the system is further configured to:

adjusting a relative transmission time between the first and second signal generators based on the determined relative delay.

14. The system of claim 8, wherein the determined relative delay is applied to subsequent signals received by the envelope tracker and power amplifier by a delay chain within a DC/DC converter comprised within the envelope tracker.

15. A non-transitory computer-readable memory medium comprising program instructions which, when executed by a computer, are configured to operate a delay measurement system to determine a signal delay in a device under test (DUT), wherein the delay measurement system comprises the computer, a first and second signal generator, and a vector signal analyzer (VSA), and wherein said operating comprises:
   inputting, by the first and second signal generators, each of a first and second input stimuli signal into the DUT;
   receiving, from the DUT, an output signal based on the first and second input stimuli signals;
   cross-correlating, by the VSA, a reference signal with the output signal to determine a first delay offset associated with the first input stimuli signal;
   determining, by the VSA, a second delay offset associated with the second input stimuli signal based on an amplitude distortion of the output signal; and
   determining, by the computer, the signal delay between the first and second input stimuli based on a difference between the first and second delay offsets.

16. The non-transitory computer-readable memory medium of claim 15, wherein the reference signal and the first input stimuli signal comprise the same periodic constant amplitude zero autocorrelation (CAZAC) waveform, and wherein the second input stimuli signal comprises a constant voltage signal that temporarily drops to a lower voltage at periodic intervals.

17. The non-transitory computer-readable memory medium of claim 15, wherein each of the first and second input stimuli signals comprise periodic signals with the same period.

18. The non-transitory computer-readable memory medium of claim 15, wherein each of the first and second input stimuli signals comprise periodic signals with different periods.

19. The non-transitory computer-readable memory medium of claim 15, wherein said operating further comprises:
   recording an entry in a lookup table, wherein the entry comprises the determined relative delay and a description of a present configuration of the DUT.

20. The non-transitory computer-readable memory medium of claim 19, wherein the present configuration of the DUT comprises one or more of:
   an applied filter;
   a power level; and
   a carrier frequency.

* * * * *